Oct. 10, 1967     G. A. LAST ETAL     3,346,673
FORMATION OF SUBMICRON URANIUM CARBIDE
PARTICLES IN METALLIC URANIUM
Filed Nov. 19, 1965
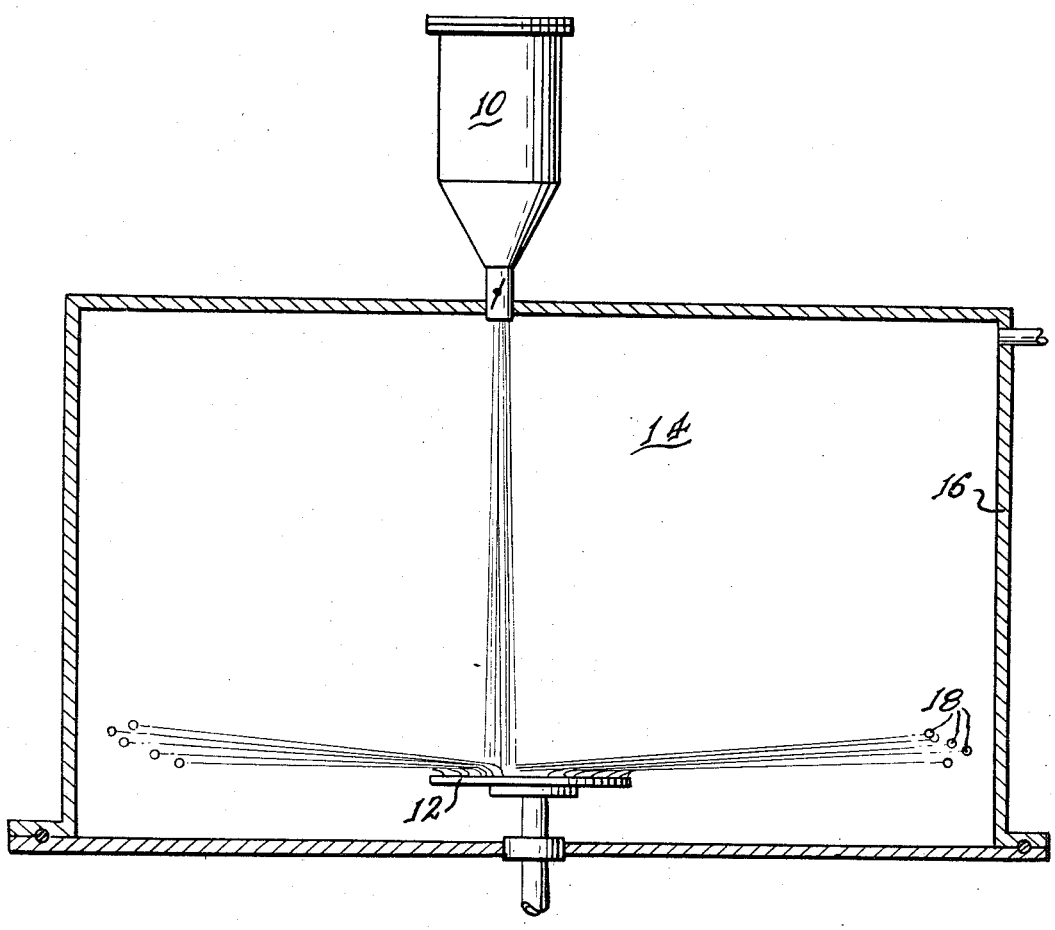
Inventors
George A. Last
Robert S. Kemper, Jr.
By:
Attorney

United States Patent Office 3,346,673
Patented Oct. 10, 1967

3,346,673
FORMATION OF SUBMICRON URANIUM CARBIDE PARTICLES IN METALLIC URANIUM
George A. Last and Robert S. Kemper, Jr., Richland, Wash., assignors to the United States of America as represented by the United States Atomic Energy Commission
Filed Nov. 19, 1965, Ser. No. 508,867
3 Claims. (Cl. 264—.5)

ABSTRACT OF THE DISCLOSURE

A method of forming a fine dispersion of uranium carbide in uranium comprising dissolving carbon in molten uranium to obtain a concentration of 700–1000 p.p.m. carbon in the uranium, forming small droplets of the resulting solution, and fast quenching the droplets to form solid shot.

---

The invention described herein was made in the course of, or under, a contract with the U.S. Atomic Energy Commission.

This invention relates to the preparation of a metallic uranium nuclear reactor fuel having high swelling resistance. The invention also relates to the preparation of a fine dispersion of uranium carbide in uranium. In more detail the invention relates to the preparation of a fuel element for a nuclear reactor incorporating a fine dispersion of uranium carbide in uranium.

When uranium or a uranium-plutonium alloy is irradiated in a nuclear reactor, the formation of gaseous fission products in the material causes it to swell. At first the swelling is gradual as the temperature is increased, but eventually the "breakaway swelling temperature" of the material is reached, at which temperature the swelling increases so much that rupture of the cladding on the material might ensue. This would prevent the free flow of coolant past the fuel element and permit fission products to escape to coolant.

While destructive swelling can be avoided by providing extremely strong cladding on the fuel material or by large alloying additions to the fuel, the addition of absorber in the form of increased cladding or of an alloying metal requires an increase in the amount of fissionable isotope in the reactor and thus increases the cost of operation of the reactor.

It is also known that incorporation of a submicron dispersion of a second phase material in the fuel material will increase the swelling resistance of the fuel and aluminum, iron or silicon intermetallic compounds formed by precipitation from solid solution have been employed for this purpose. Since carbon is present to approximately 700 parts per million in essentially all uranium which has been melted in a graphite crucible, uranium carbide as second phase material would be particularly suitable, since little additional carbon need be added to the uranium above that which is inherently present.

Uranium carbide also has the important advantages of low solubility and high thermal stability to temperatures even in the gamma uranium region.

To be effective this dispersed phase must be stable in the metal structure at elevated temperatures, must not agglomerate to reduce the number of particles, must be insoluble in the matrix, and must not move to preferred locations in the structure such as grain boundaries. In normally cast uranium the carbon inherently present does not satisfy these requirements, since it is present in the form of massive inclusions of uranium monocarbide in the 10–25 micron diameter range or in conjunction with uranium nitride or uranium oxide. The high melting point of the carbide and the low solubility of carbon in gamma phase uranium (110–185 p.p.m. at the melting point) lead to the formation of primary carbide particles. The uranium carbide formed in the melt remains essentially unchanged throughout fabrication and heat treatment, finally occurring as inclusions aligned in the direction of metal flow during fabrication. These large inclusions of uranium carbide adversely affect the physical properties of the fuel and do not greatly increase the swelling resistance of the fuel.

It is thus an object of the present invention to improve the physical characteristics of metallic uranium.

It is also an object of the present invention to develop a method of preparing a uniform dispersion of uranium carbide in uranium.

It is another object of the present invention to develop a method of preparing an improved metallic uranium nuclear reactor fuel element.

These and other objects of the present invention are attained by adding sufficient carbon to molten uranium at a temperature high enough to dissolve 700–1000 p.p.m. carbon to attain such a concentration, forming small droplets of this solution, fast quenching the droplets to form solid shot, encapsulating the shot, and coextruding the encapsulated shot to form a clad fuel rod. By following this procedure the carbon is trapped in non-equilibrium solid solution and precipitates as extremely small platelets less than 1 micron in width and up to 2–3 microns in the maximum dimension during quenching.

The sole figure of the drawing is a sketch of apparatus which may be used in practicing the present invention. As shown, molten uranium containing 700–1000 p.p.m. dissolved carbon is poured from container 10 on to spinning disk 12 which is located in chamber 14 defined by walls 16. Droplets 18 of uranium solidify before striking the walls.

A specific embodiment of the invention will next be described. Uranium was melted and the temperature of the melt was raised to 1315–1425° C. Sufficient carbon was added to the melt to raise the carbon content to 1000 p.p.m. This melt was poured from a distance of 14 inches at a rate of 15–20 pounds per minute on a spinning 6-inch diameter plate made of steel, coated with zirconia. The plate was rotating at a speed of 300–600 r.p.m. within a chamber filled with a stagnant helium atmosphere at 20–24" Hg and approximately room temperature. The droplets of uranium thrown from the plate were quenched in the helium, the droplets solidifying into −10+250 mesh shot before striking the walls of the chamber.

Microphotographs of the dispersion of uranium carbide in carbon present in this shot clearly show that the uranium carbide is present in the form of a uniform dispersion of platelets having a maximum dimension of about 2 microns. Microphotographs of cast uranium containing similar quantities of carbon show that the carbon is present in the form of massive inclusions 10–25 microns in diameter.

Fuel rods were then prepared by filling Zircaloy-2 cans with shot and coextruding as follows:

| Extrusion No. | Container Size | Die Size | Reduction | Preheat Temp. (° C.) | Time, hr. | Tooling Temp. (° C.) | Cladding Material |
|---|---|---|---|---|---|---|---|
| 1 | 1.250 | 0.375 | 11.4/1 | 640 | 2 | 500 | Zr-2 with Cu. |
| 2 | 1.250 | 0.350 | 13/1 | 640 | 2 | 500 | Do. |
| 3 | 2.250 | 0.616 | 13.3/1 | 640 | 3 | 500 | Do. |
| 4 | 3.00 | 0.780 | 15.4/1 | 620 | 3 | 500 | Do. |
| 5 | 3.00 | 0.780 | 15.4/1 | 620 | 3 | 500 | Do. |
| 6 | 4.00 | 2.125 | 3.6/1 | 600 | 4 | 500 | Cu only. |
| 7 | 4.00 | 2.125 | 3.6/1 | 600 | 4 | 500 | Do. |

The dimensions of the Zircaloy-2 cans were 1.100 inches O.D. and 0.900 inch I.D. for extrusions 1 and 2, 2.125 inches O.D. and 1.974 inches I.D. for extrusion No. 3 and 2.190 inches O.D. and 2.713 inches I.D. for extrusions 4 and 5, the copper making up the remainder of the container size and serving as a lubricant.

Samples of rod containing fine carbide particles in accordance with this invention and samples containing larger carbide particles prepared from cast uranium were irradiated. While results of the irradiation proper were inconclusive, post-irradiation annealing studies show less swelling of the samples containing fine carbide particles than of those containing large carbide particles. This clearly indicates that the fine particles present keep the gas bubbles resulting from fission products small and thus the volume increase to a minimum.

It will be appreciated that the conditions given are not necessarily exclusive and are only typical of those necessary to produce the desired dispersion. Similar quench conditions from the liquid could be obtained by other means and consolidation to metallic shapes would be possible over a wider range of conditions than those given.

It will be understood that the invention is not to be limited to the details given herein but that it may be modified within the scope of the appended claims.

The embodiments of the invention in which an exclusive property or privilege is claimed are defined as follows:

1. A method of forming a fine dispersion of uranium carbide in uranium comprising dissolving carbon in molten uranium to obtain a concentration of 700–1000 p.p.m. carbon therein, forming small droplets of the resulting solution, and fast quenching said droplets to form solid shot.

2. A method according to claim 1 wherein the temperature of the molten uranium is 1315° C. to 1425° C. and the total carbon content is 1000 p.p.m.

3. A method according to claim 2 wherein the shot is formed by pouring molten uranium on a rotating plate and fast quenching the uranium droplets thrown therefrom in a helium atmosphere.

References Cited

UNITED STATES PATENTS

| 1,829,950 | 11/1931 | Voigtlander et al. | 23—349 |
| 2,728,107 | 12/1955 | Hershey | 264—8 |
| 3,099,041 | 7/1963 | Kaufman | 264—.5 |
| 3,114,688 | 12/1963 | Wyatt et al. | 72—264 |
| 3,160,951 | 12/1964 | Markert et al. | 29—474.3 |

OTHER REFERENCES

Krall German application No. 1,135,871, printed Sept. 6, 1962 (KL12N10).

L. DEWAYNE RUTLEDGE, *Primary Examiner.*